Dec. 6, 1960  J. SMART  2,963,580

INFRA-RED ANALYSING APPARATUS

Filed Sept. 17, 1957  2 Sheets-Sheet 1

United States Patent Office 2,963,580
Patented Dec. 6, 1960

2,963,580
INFRA-RED ANALYSING APPARATUS

John Smart, Newcastle-upon-Tyne, England, assignor to Sir Howard Grubb Parsons & Company Limited, Newcastle-upon-Tyne, England Filed Sept. 17, 1957, Ser. No. 684,589

Claims priority, application Great Britain Sept. 24, 1956

12 Claims. (Cl. 250—43.5)

This invention relates to infra-red analysing apparatus wherein infra-red radiations are passed in two or more beam paths, each containing one or more tubes fitted at each end with windows transparent to these radiations and capable of being filled with any desired fluid. In some types the infra-red radiations originate from a single source while in other types a separate source is used for each beam path. The radiations emerging from the absorption paths may be received by separate detectors or combined and caused to fall on a single receiver.

The basic design of detector to which the present invention relates has one or more receiving chambers provided with windows transparent to the radiations and filled with gas capable of absorbing the wavelengths absorbed by the component to be detected. The detector is hermetically sealed and is provided with a thin metal diaphragm which is deformed by the pressure increase occurring when the gas in the receiving chamber or chambers is heated by the radiations entering through the window or windows. The metal diaphragm is adjacent to a fixed electrode and movements of the diaphragm give rise to changes of capacity.

The radiations are interrupted by a rotating sector disc and the resulting capacity changes can be made to provide a voltage fluctuating at the frequency of interruption of the radiations, which voltage can be amplied by a conventional A.C. amplifier. If the analyser is of the direct deection type, the output from the amplifier is measured with a valve voltmeter or, if of sufficient magnitude, rectified and fed to a D.C. output meter; the meter indication provides a measure of absorption by the sample fluid. On the other hand, if a null-balance instrument is required the amplifier output is used to drive a servo-motor which moves an optical attenuator into or out of one of the radiation paths, so that an energy balance is continuously maintained and the position of the attenuator can be made to indicate the amount of absorption due to sample fluid.

In Figure 1 operation of known form of infra-red gas analyser is indicated. Radiations from infra-red sources A, A pass through absorption tubes B, B and thence to receiving chambers C, C of a detector which chambers are filled with the gas to be detected or with another gas having similar absorption characteristics.

A rotating shutter S allows light to pass intermittently, but simultaneously, through the tubes B and a heating effect is produced in each of the two chambers C. These receivers are in communication respectively with the two condenser chambers $C_1$, $C_2$ partitioned off from each other by a thin metal diaphragm D which, in combination with a closely adjacent insulated and perforated metal plate E, forms an electrical condenser.

Any deformation of the thin diaphragm resulting from a pressure difference between the two receiving chambers C, C causes a variation of this capacity. If no absorption occurs in the tubes B and the system is otherwise symmetrical, the heating effect in the two receiving chambers will be the same and no pressure difference between them will arise, but if now sample gas is introduced into one of the tubes B the energy balance will be upset if the sample contains any of the particular component to be determined, since radiation is absorbed by the gas before it can reach C. Consequently a pressure difference between the two chambers C is set up each time the shutter S allows radiation to pass.

The resulting capacity changes give a measure of the absorption of radiation by the sample. A small leak across the diaphragm is provided to prevent any deformation which might be caused by a small temperature difference between the receiving chambers C, C. Such leak, however, is too small to reduce appreciably the fluctuating pressure differences which occur in normal use as the shutter S rotates.

In some cases a fluid to be analysed for a certain component has other components which absorb infra-red radiations in the range of wavelength absorbed by the component to be detected and in these cases the simple form of analyser already described is not satisfactory since serious interference between the wanted and the unwanted components occurs.

In the simpler cases discrimination can be improved by the use of filters but in general the proposed methods have either been suitable over a limited range of concentration only or have reduced the sensitivity of the instrument or both.

The object of the present invention is to provide a method, and apparatus for carrying out the method, for giving satisfactory discrimination between wanted and unwanted components which is free or substantially free from the above disadvantages.

According to the invention, in infra-red analysing apparatus having the detection means of the kind described and in which a fluid under test contains components having regions of absorption which overlap those of the component to be detected, the change in electrical capacity produced in the detection means by the absorption of the said unwanted components is nullified or reduced by effecting a capacity change in the said detection means in opposition to the first-mentioned capacity change.

The invention also consists in apparatus for carrying out the method substantially as described below with reference to Figures 2-8 of the accompanying diagrammatic drawings, in which.

Figure 1:
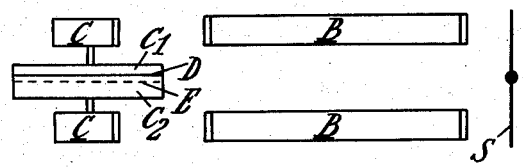
Figure 2:
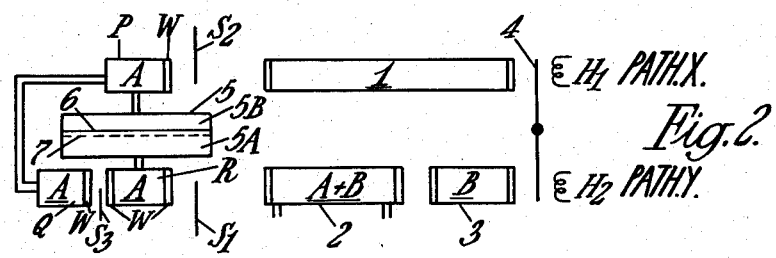
Figure 2 shows an analyser having two absorption paths for radiations and two sources of radiation.

In carrying the invention into effect in the forms illustrated by way of example in Figure 2, the analyser comprises two absorption paths for infra-red radiations. One path is used as a comparison path and contains a tube 1 filled with a fluid, for example, a gas which has zero or constant small absorption in the range of wavelengths absorbed by the component to be detected in the fluid under test. The other path is the sample path and contains in container 2 the fluid under test, which, we shall assume for the purposes of explanation, is a gas and has two components A and B, the component to be detected being A, the unwanted component being B, the absorption characteristics of B being such that it absorbs certain wavelengths in the range of wavelengths absorbed by A.

To help reduce the effect of B, a tube 3 is filled with this gas and located between tube 2 and a radiation chopper 4 which interrupts the radiation entering each absorption path from sources $H_1$ and $H_2$ simultaneously and at regular intervals.

The detection means comprise a detecting condenser 5 which is partitioned off into two chambers 5A, 5B, by a diaphragm 6 which is adjacent to a fixed electrode 7 the diaphragm and electrode forming together an electrical condenser.

The condenser chambers 5A, 5B are each in communication with a receiving chamber in a radiation path. Chamber 5A is in communication with receiving chamber R in the sample path whilst chamber 5B is in communication with receiving chamber P in the comparison path. The chambers R and P and hence chambers 5A and 5B are filled with gas A or a gas having absorption regions common with gas A.

In accordance with the invention the detection means are modified by the inclusion of a further receiving chamber Q in the sample path. This chamber Q communicates with chamber P and hence also with chamber 5B. Chamber P has a window W, transparent to the radiation at one end only as shown. Chamber Q has similarly one window W. Chamber R, however, has two such windows W one at each end of the chamber.

The operation of such analyser is as follows:

In path X a fixed amount of energy is received into chamber P and some is absorbed by the gas filling (gas A). In path Y radiations are absorbed by gas B in tube 3, and the remainder enter tube 2, where a small proportion is absorbed by gas B in the sample and further proportion is absorbed by gas A. The remaining radiations enter chambers R and Q, and a proportion is absorbed in each. Radiations absorbed in Q, however, produce an increase in pressure in P and therefore act in opposition to radiations absorbed in R. Since the radiations reaching R and Q and capable of being absorbed by gas B in the sample are only moderately absorbed, the absorption in Q will be almost as great as in R, and by suitably proportioning R and Q the pressure effects produced on opposite sides of the diaphragm can be made equal and sensitivity to B made a minimum.

Of course, if an exact balance is made when tube 2 contains no absorbing gas, cancellation will not be quite complete when tube 2 cotnains A, B or a mixture of the two, since the nature of the radiations is slightly altered in wavelength distribution after passing through gas A or B in tube 2. However, this effect is small since a high concentration of B has already been employed in tube 3 and the further absorption by gas B in tube 2 will be comparatively small; absorption by A of wavelengths capable of being absorbed by B is in general small. Sensitivity to gas A in the sample in tube 2 will remain satisfactorily high since the radiations capable of being absorbed by A will be absorbed to a considerable extent in R and to a much smaller extent in Q.

To balance the energy in the two optical paths when the sample is absent in tube 2 an adjustable shutter S1, is placed in the path having greater energy.

Sensitivity to B is minimised for an average sample in tube 2, either by varying the energy radiated from infra-red source H2 through adjustment of temperature, by varying the concentration of gas B in tube 3 and so changing the filtering effect, or by separating chambers Q and R and placing an adjustable shutter S3 between them.

If a null-balance instrument is desired an automatically adjustable shutter S2 can be placed in path X. As absorption by gas A in the sample increases in path Y, S2 moves until this absorption is balanced by a reduction of energy in path X. Movement of S2 has no influence on the sensitivity of the instrument to either gas A or gas B, and this is a desirable characteristic.

Figure 3:
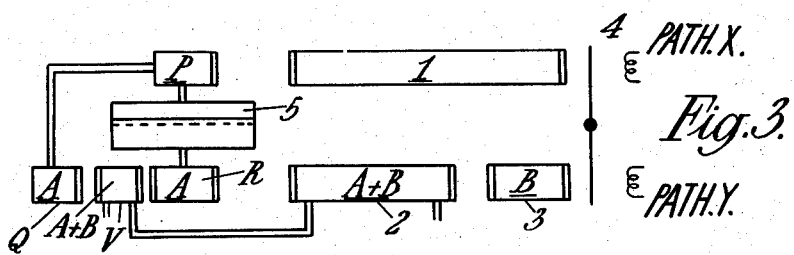
Figure 3 shows a modification of the analyser shown in Figure 2.

In a further form of the invention an absorption tube V shown in Figure 3 is mounted between the chambers Q and R and is connected in series with tube 2 so that sample gas can be passed through it. The purpose of this is to improve the cancellation of response to gas B over a wider range of concentration of A. If matters are arranged so that for a given concentration of A in tube 2 equal effects are produced in chamber Q and R by radiations capable of being absorbed by gas B (B radiations), when A is increased the more readily absorbed B radiations which have been preferentially removed in chamber R will instead be absorbed in tube 2, so that a slightly greater effect will now be obtained in chamber Q than in chamber R. However, if the radiations also traverse an additional tube V, an increased concentration of A in the sample gas will absorb some of the B radiations which would otherwise have reached chamber Q and so the balance between the effects produced in chambers Q and R can be restored.

In yet another form of the invention tube V is filled with a suitable filtering gas that is to say having regions of absorption common with the B radiations and permanently sealed. Thus a variation between the absorption characteristics of chambers R and Q can be made.

Figure 4:
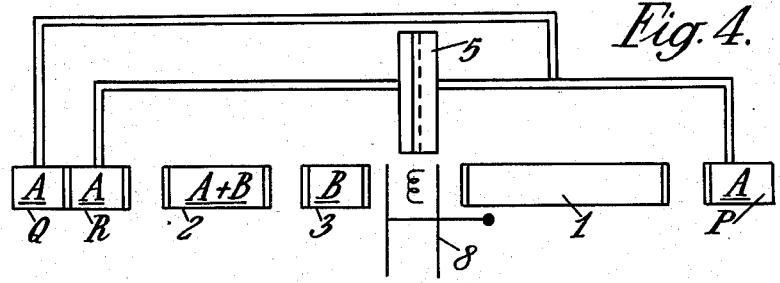
Figure 4 shows an analyser having two absorption paths for radiation but having a single source of radiation.

In another form of the invention the receiving chambers P, Q and R of the detecting condenser are arranged in line as shown in Figure 4. In this case a single infra-red source can be used provided that a double bladed chopper 8 is used to chop simultaneously the radiations entering tubes 1 and 3. This arrangement is an extension of the form of detecting condenser described in British patent application No. 23,314 of 1956 and follows along the lines described in the present application.

Figure 5:
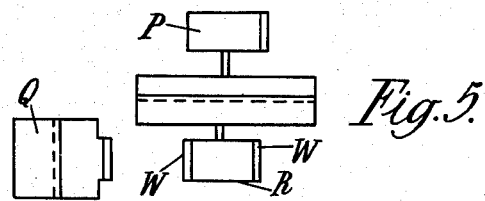
Figure 5 shows a form of the invention in which two detectors are used.

In yet another form of the invention two separate detectors are used as shown in Figure 5, a normal two-chamber detector being provided but with a window W at either end of the receiving chamber R, and behind this chamber is placed a single-chamber detector Q having a window through which radiations pass after traversing chamber R. The detector Q is provided with a diaphragm assembly so that radiations absorbed by the gas A contained in Q increase the pressure and deform the diaphragm in the usual manner.

If now the two electrical capacities of the two detectors are connected in series, or in parallel, so that while one capacity increases as a result of absorption of radiation the other decreases, the capacity changes due to the presence of B in the gas sample can be arranged to cancel. In this case Q can contain gas A, B or mixture of the two adjusted in concentration and proportions to produce desired cancellation for a particular type of gas sample.

Figure 6:
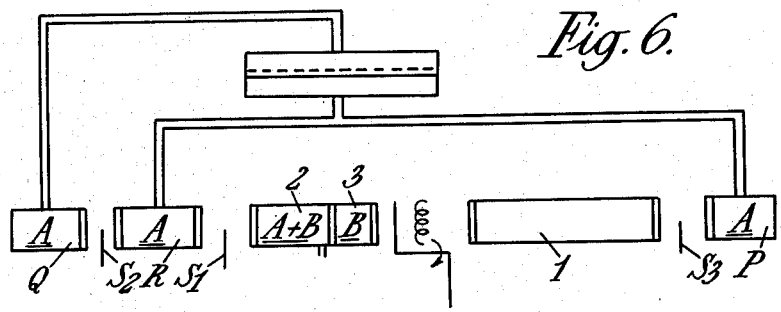
Figure 6 shows an analyser having two absorption paths, one source of radiation and an alternative way of chopping the radiations.

In an alternative form of the invention, the chambers are connected in a rather different manner as indicated in the Figure 6 and two radiation paths are here chopped alternately instead of simultaneously.

The comparison path is to the right of the source and the sample path to left as in Figure 4. When the sample tube is empty the energy in the two paths is balanced by shutter S1 so that the pressure effect on the diaphragm is the same whichever path is exposed and no signal results. On passing sample into the tube 2 gas A reduces considerably the radiations absorbed in R and to a smaller extent those absorbed in Q so that the energy balance is upset and a signal is obtained. The effect of B in the sample gas is a little different since similar loss of absorption will occur in R and Q and since absorption in Q will tend to neutralise the effect of absorption in R, it is possible by means of shutter S2 to obtain exact cancellation for any particular composition of gas sample. An extra filter tube can be interposed between R and Q if desired as already described, so that the cancellation will hold good for a wider range of sample composition.

In the null balance version of the instrument a servo operated balancing shutter S3 is provided.

Figure 7:
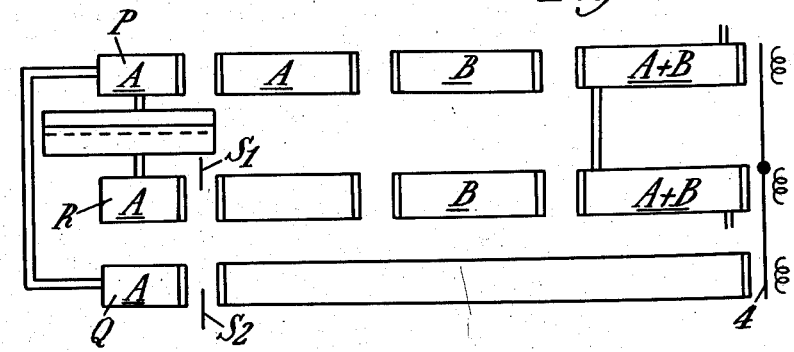
Figure 7 shows an analyser with three absorption paths.

In another arrangement shown in Figure 7 three absorption paths are provided. This arrangement can be used in the manner shown in Figure 2 but with the advantage that the null balance shutter S2 can be placed in the third path which need contain no absorbing gas, so that it does not upset the cancellation of the effect of gas B in the other paths as it moves in and out of the third beam.

In operation, a single heater may be employed for each path or fewer heaters may be used with a beam splitter to divide the radiation into two or more paths. The chopper 4 alternately exposes and obscures all three paths simultaneously.

Figure 8:
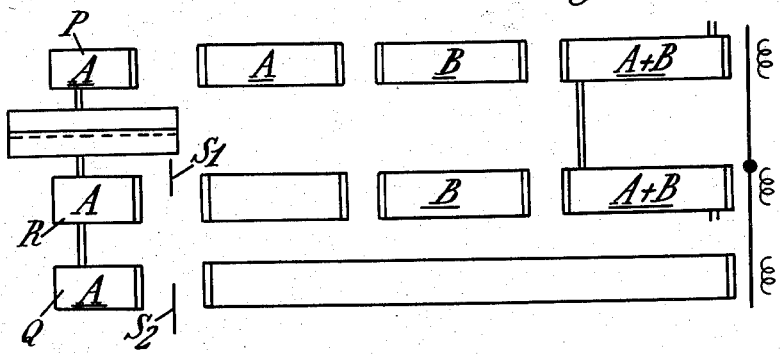
Figure 8 shows an analyser similar to that shown in Figure 7 but with an alternative form of detector.

This detector works equally well if chambers R and Q are connected to the same side as shown in Figure 8 instead of on opposite sides. The null balance shutter S2 will of course operate in the reverse manner, since as the absorption by gas A in the sample increases and reduces the energy received by chamber R, shutter S2 is withdrawn to allow more energy to pass into chamber Q and so keep the total energy constant.

I claim:

1. In infra-red analysing apparatus comprising a source of radiation from which two beam paths emanate, namely, a first beam path and a second beam path, the first beam path having means containing sample fluid at least one component of which is to be detected and filter means containing unwanted components, that is to say components of the sample fluid having infra-red absorption bands of wavelengths which overlap those of a component to be detected, the second beam path being a comparison path containing a substance which has no infra-red absorption or a constant small absorption in the range of wavelengths absorbed by said component to be detected, means for interrupting the radiation in each path at regular intervals, adjustable means for blanking off part of the radiation in at least one beam path and detection means comprising a detecting condenser partitioned off into two chambers by a diaphragm adjacent a fixed electrode said diaphragm and electrode forming an electrical condenser, each condenser chamber having an extension forming a receiving chamber in a beam path, each condenser chamber and consequently its receiving chamber being filled with a component to be detected or a fluid having regions of infra-red absorption in common therewith; the provsion of an additional receiving chamber in said first beam path and adapted to receive radiations from the other receiving chamber in the said first beam path which additional receiving chamber contains a component to be detected or a fluid having regions of infra-red absorption in common therewith and is adapted to produce an electrical capacity change which opposes the capacity change produced by the other receiving chamber in said first beam path.

2. An infra-red analyser as claimed in claim 1 in which the electrical capacity change produced by the additional receiving chamber is caused to oppose the capacity change produced by the other receiving chamber in said first beam path by connecting said additional receiving chamber to the condenser chamber on the opposite side of the diaphragm to the condenser chamber of which the other receiving chamber in said first beam path forms an extension.

3. An infra-red analyser as claimed in claim 2 in which the two beams of radiation are interrupted simultaneously at regular intervals and the receiving chamber of the second beam path and the additional receiving chamber in the first beam path are in communication with the same condenser chamber.

4. An infra-red analyser as claimed in claim 2 in which a further container containing sample fluid is interposed between said two receiving chambers in said first beam path.

5. An infra-red analyser as claimed in claim 2 in which a filter tube is interposed between the two receiving chambers in the first said beam path.

6. An infra-red analyser as claimed in claim 1 in which the first beam path and the second beam path are on opposite sides of the source of radiation.

7. An infra-red analyser as claimed in claim 6 in which the receiving chamber in the second beam path and the additional receiving chamber in the first beam path are in communication with the same condenser chamber and a double bladed rotary chopper is disposed with a blade on each side of the source for radiation so as to interrupt the radiation in each path simultaneously at regular intervals.

8. An infra-red analyser as claimed in claim 6 in which the receiving chamber in the first beam path and the receiving chamber in the second beam path are connected to the same condenser chamber and the additional receiving chamber in the first beam path is connected to the other condenser chamber of the detecting condenser the beam paths being interrupted sequentially at regular intervals.

9. An infra-red analyser is claimed in claim 1 in which the additional receiving chamber in the first beam has a diaphragm and electrode incorporated therein which constitute an electrical condenser the capacitance of which varies with variations of pressure of the fluid in said chamber the said capacitance changes being used to oppose electrically the capacitance changes produced by the detecting condenser.

10. An infra-red analyser comprising a source unit of radiation from which two beam paths of radiation emanate, namely, a first beam path and a second beam path, the first beam path having means containing a sample fluid at least one component of which is to be detected and filter means containing unwanted components, that is to say, components of the sample fluid having infra-red absorption bands of wavelengths which overlap those of a component to be detected, the second beam path being a comparison path containing a substance which has no infra-red absorption or a constant small absorption in the range of wavelengths absorbed by said component to be detected, means for interrupting the radiation in each beam path simultaneously at regular intervals, adjustable means for blanking off part of the radiation in at least one beam path and detection means comprising a detecting condenser partitioned off into two chambers by a diaphragm adjacent a fixed electrode said diaphragm and electrode forming an electrical condenser, each condenser chamber having an extension forming a receiving chamber in a beam path, each condenser chamber and consequently its receiving chamber being filled with the component to be detected or a fluid having regions of infra-red absorption in common therewith and an additional receiving chamber in the first beam path adapted to receive radiation from the other receiving chamber in said first beam path, said additional receiving chamber containing the component to be detected or a fluid having regions of infra-red absorption in common therewith, the arrangement being that the receiving chamber in the first beam path is in communication with one condenser chamber and the additional receiving chamber and the receiving chamber in the second beam path are in communication with the other condenser chamber.

11. An infra-red analyser as claimed in claim 10 in which a further container containing sample fluid is interposed between the receiving chamber and the additional receiving chamber in the first path.

12. An infra-red analyser as claimed in claim 1 and operating on the null balance principle.

References Cited in the file of this patent

UNITED STATES PATENTS

| | | |
|---|---|---|
| 2,583,221 | Martin | Jan. 22, 1952 |
| 2,605,426 | Martin | July 29, 1952 |
| 2,688,089 | Williams | Aug. 31, 1954 |
| 2,741,703 | Munday | Apr. 10, 1956 |
| 2,758,216 | Luft | Aug. 7, 1956 |